United States Patent
Chae

(10) Patent No.: US 6,539,582 B1
(45) Date of Patent: Apr. 1, 2003

(54) HINGE DEVICE

(75) Inventor: Kwon-Byung Chae, Pucheon-si (KR)

(73) Assignee: P.K. Tech System Co., Ltd., Kyungki-do (KR)

(*) Notice: Subject to any disclaimer, the term of this patent is extended or adjusted under 35 U.S.C. 154(b) by 0 days.

(21) Appl. No.: 09/904,153

(22) Filed: Jul. 12, 2001

(30) Foreign Application Priority Data

Feb. 22, 2000 (KR) .......................................... 2001-4631

(51) Int. Cl.⁷ .......................... E05C 17/64; E05D 11/08
(52) U.S. Cl. ............................. 16/340; 16/337; 16/273
(58) Field of Search .................. 16/340, 342, 337–339, 16/273, 289, 308

(56) References Cited

U.S. PATENT DOCUMENTS

| | | | | |
|---|---|---|---|---|
| 5,022,778 A | * | 6/1991 | Lu | 16/273 |
| 5,109,570 A | * | 5/1992 | Okada et al. | 16/289 |
| 5,208,944 A | * | 5/1993 | Lu | 16/278 |
| 5,239,731 A | * | 8/1993 | Lu | 16/340 |
| 5,269,047 A | * | 12/1993 | Lu | 16/340 |
| 5,702,197 A | * | 12/1997 | Chen | 16/342 |
| 5,940,936 A | * | 8/1999 | Lu | 16/337 |
| 6,038,739 A | * | 3/2000 | Katoh | 16/329 |
| 6,154,925 A | * | 12/2000 | Miura | 16/338 |
| 6,163,928 A | * | 12/2000 | Chung | 16/337 |

FOREIGN PATENT DOCUMENTS

| | | | |
|---|---|---|---|
| JP | 10-26126 | * | 1/1998 |
| JP | 2001-99133 | * | 4/2001 |

* cited by examiner

Primary Examiner—Chuck Y. Mah
(74) Attorney, Agent, or Firm—Wood, Herron & Evans, L.L.P.

(57) ABSTRACT

A hinge device including: a bracket having a shaft hole; a shaft inserted through the shaft hole; a longitudinal insert home diametrically formed on one or both sides of the shaft and a pair of shoulder members formed centrally on the shaft with a fixed distance from one another. A first shoulder member is larger than the second shoulder member. A torsion spring is placed between the bracket and the shaft. A plurality of space washers having holes placed on one or both sides of the bracket. A plurality of disc springs have through holes which have protrusion members that insert into the insert home of the shaft when the shaft is inserted into the bracket. A guide washer having a through hole which has protrusion member that inserts into the insert home of the shaft when the shaft is inserted into the bracket. A nut screw onto the shaft to stabilize a horizontal position of the attached elements. A groove formed on the circumferences of the hole members in the direction that the hole members rotates contains lubricating oil which is evenly distributed to decrease the noise and wear.

2 Claims, 3 Drawing Sheets

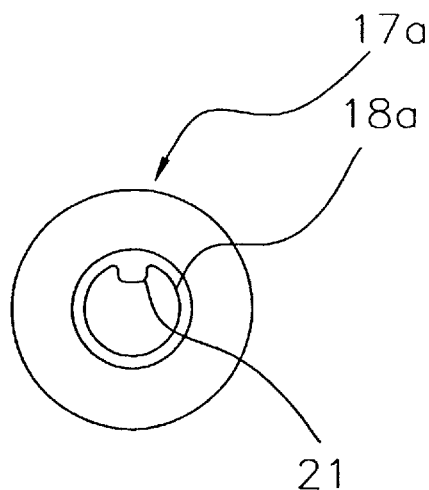
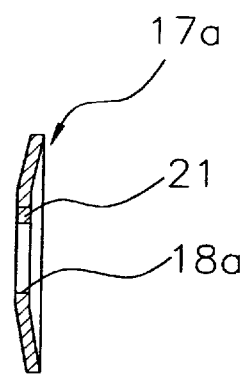
FIG. 4a
FIG. 4b
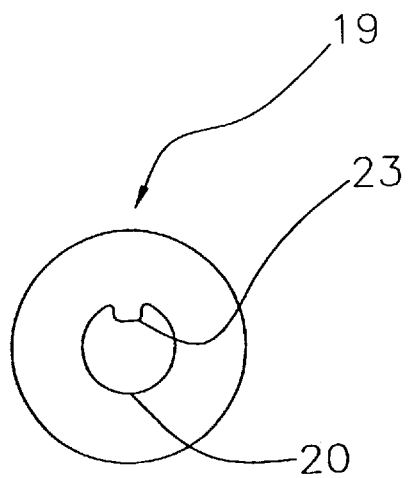
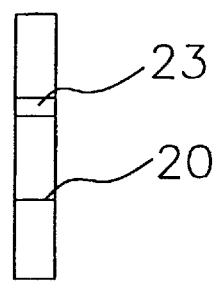
FIG. 5a
FIG. 5b

HINGE DEVICE

TECHNICAL FIELD

This invention relates to a hinge device for a portable electronic device.

BACKGROUND

The development of the electronic industry has provided people with smaller and lighter portable electronic devices, such as notebook computers and cellular phones which are highly mobile.

The portable electronic devices such as the notebook computers are comprised of the main body, a liquid crystal display (LCD) cover, and a hinge device pivotally connecting the main body and the LCD cover so that the cover may be opened or closed by rotation of the hinge device. To use the notebook computer, the LCD cover is opened and secured at a certain desired angle. In order to maintain the LCD cover at the desired angle, a support mechanism is placed on the hinge device that connects the LCD cover and the main body.

Generally, conventional hinge devices comprise a spring piece placed at the pivot to secure the LCD cover at a fixed angle. However, due to frequent rotation of the hinge device, the components of the hinge device may be subject to problems such as instability and wear. My previous invention (Korean Utility Model No. 173283) deals with the aforementioned problems by employing a disc spring instead of the conventional coil spring to reduce noise and wear and tear. However, this previous hinge device may not have sufficient support load capability.

SUMMARY

It is therefore an object of the present invention to provide a hinge device in which the aforementioned problems are addressed by utilizing one or more torsion springs and one or more disc springs to increase the support load while minimizing the instability of the structure. The aforementioned object is satisfied by a hinge device comprising a bracket having a shaft hole. A shaft having first and second ends and threads extending inward from the second end is inserted through the shaft hole. A longitudinal insert home extends along the shaft proximate the second end of the shaft. A pair of shoulder members are formed between the first and second ends of the shaft, and each shoulder member is placed at a fixed distance from the other and the first shoulder member is larger than the second shoulder member. A torsion spring is coupled between the bracket and the first shoulder member of the shaft to apply torque to the shaft as the shaft is rotated relative to the bracket. A plurality of spaced washers are placed on one or both sides of the bracket. A plurality of disc springs have respective through holes with first protrusion members located in the insert home of the shaft when the shaft is inserted into the bracket. The disc springs are located between the second end of the shaft and the bracket. A guide washer has a through hole with a second protrusion member located in the insert home of the shaft. The guide washer is located between the disc springs and the second end of the shaft. A nut is screwed onto the threads of the shaft to stabilize a horizontal position of the attached elements.

BRIEF DESCRIPTION OF THE DRAWINGS

FIG. 4a is a side view of a disc spring in FIG. 1;

FIG. 4b is a front plan view of a disc spring of FIG. 1;

FIG. 5a is a side view of a guide washer in FIG. 1; and

FIG. 5b is a front plan view of a guide washer of FIG. 1.

DETAILED DESCRIPTION OF THE PREFERRED EMBODIMENT

Figure 1:
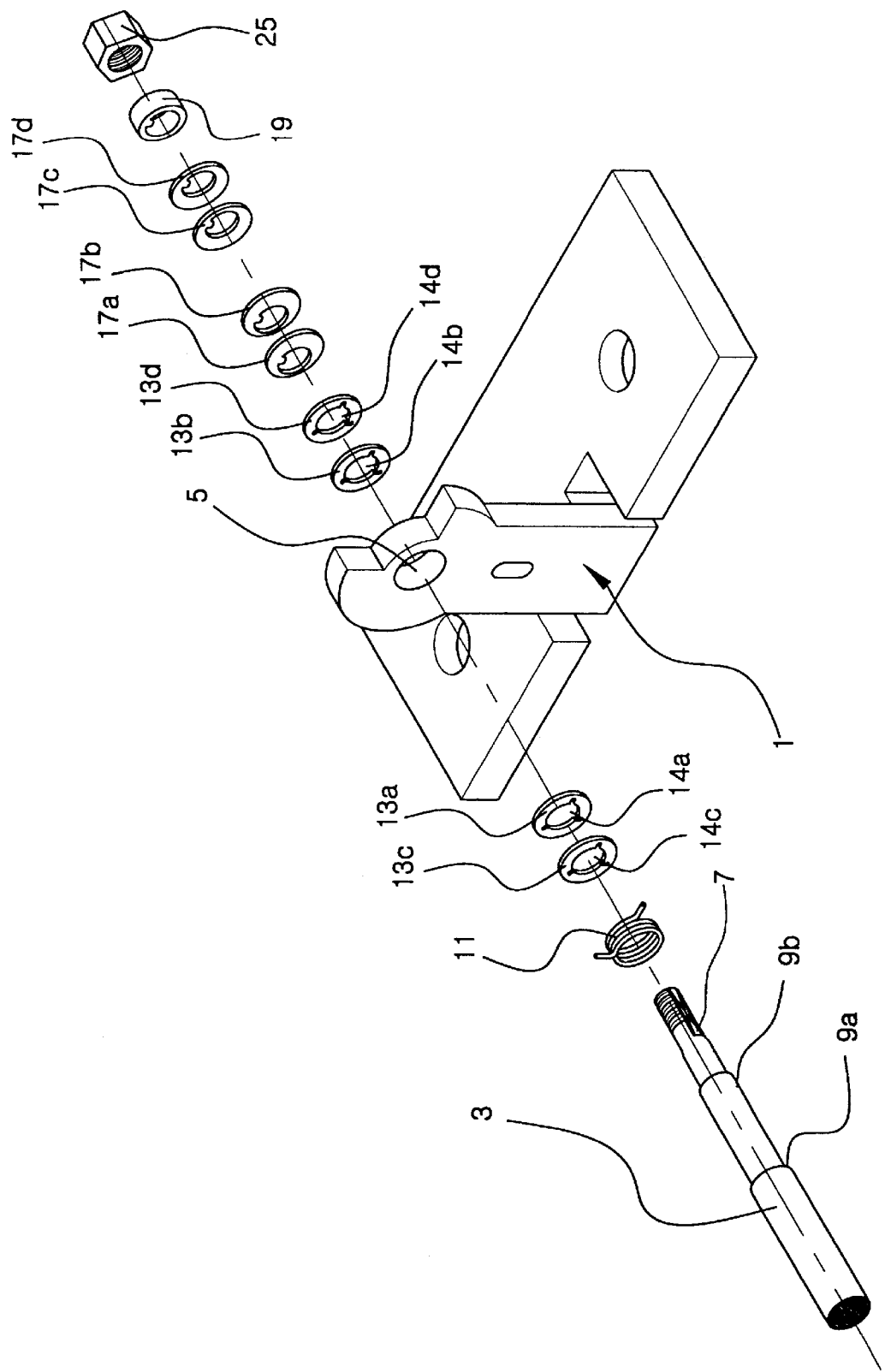
FIG. 1 is an exploded perspective view of a hinge device in accordance with the present invention.
Figure 2:
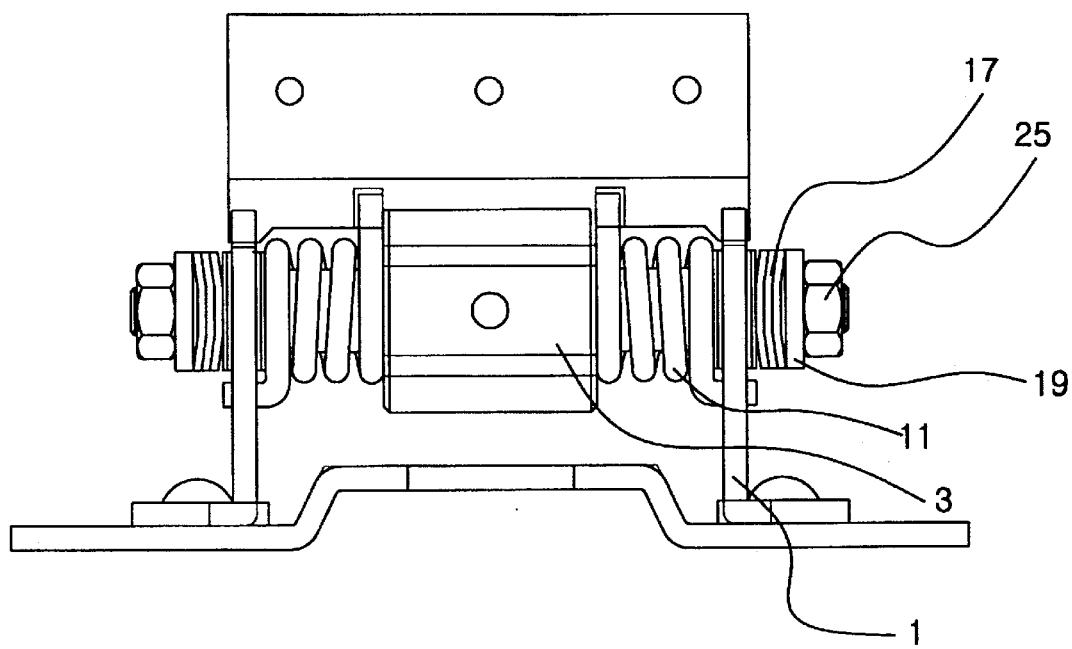
FIG. 2 is an elevated, assembled view of preferred embodiment of a hinge device of FIG. 1.

Referring to FIG. 1, the hinge device in accordance with the present invention comprises a bracket 1 and a shaft 3. Bracket 1 includes a shaft hole 5 in which shaft 3 is inserted. A longitudinal insert home 7 is diametrically formed on one or both sides of the shaft 3. Shoulder members 9a, 9b are formed centrally on the shaft 3, and each shoulder member 9a, 9b is placed at a fixed distance from the other and first shoulder member 9a is larger than the second shoulder member 9b.

A coil torsion spring 11 is positioned between the bracket 1 and the first shoulder member 9a of the shaft 3 so that the hinge can be maintained at the desired angle through little elasticity.

Figure 3:
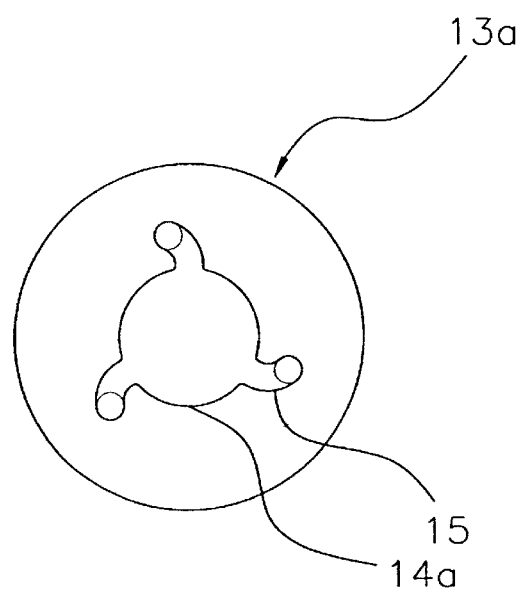
FIG. 3 is a front plan view showing a space washer in FIG. 1.

Space washers 13a, 13b, 13c, 13d formed in pairs are placed both sides of the shaft hole 5 of the bracket 1 such that the shaft 3 is inserted through the holes 14a, 14b, 14c, 14d of space washers 13a, 13b, 13c, 13d when the shaft 3 is inserted into the shaft hole 5, and a pair of space washers 13a, 13c placed at one side of the shaft hole 5 and other pair of space washers 13b, 13d are placed on the opposite side. Furthermore, as shown in FIG. 3, along the circumferences of the hole members 14a, 14b, 14c, 14d one or more grooves 15 may be formed.

The disc springs 17a, 17b, 17c, 17d formed in a dish shape with a concaved surface are placed next to the space washer 13d such that one of the disc springs 17a is in contact with the outer space washer 13d. A guide washer 19 is placed next to the outer disc spring 17d in a touching manner.

Referring to FIGS. 4a, 4b, 5a and 5b, the disc spring 17a and the guide washer 19 comprise circular shape through holes 18a, 19, and protrusion members 21, 23 are formed on the inner circumferences of through holes 18a, 19. As shown in FIG. 1, the protrusion members 21, 23 of the through holes 21, 23 fit into the longitudinal insert home 7 of the shaft 3. A nut 25 is screwed onto the shaft 3 to stabilize a horizontal position of the attached elements.

The hinge device in accordance with the present invention operates in the following manner. When the LCD cover of the notebook computer is opened, the spring 11 rotates creating a torque, and the disc springs 17a, 17b, 17c, 17d placed between the space washers 13b, 13d and the guide washer 19 expands which result in generation of friction that maintains the hinge device at the desired angle.

The protrusion members 21, 23 formed on the through holes of the disc springs 17a, 17b, 17c, 17d and the guide washer 19 insert into the insert home 7. As a result, during the open/shut motions of the LCD cover, the shaft 3 minimizes the movements of the disc springs 17a, 17b, 17c, 17d and the guide washer 19 enhancing the operation efficiency.

Furthermore, the space washers 13a, 13b, 13c, 13d placed at both sides of the shaft hole 5 of the bracket 1 support the disc springs 17a, 17b, 17c, 17d and the groove 15 formed on the circumferences of the hole members 14a, 14b, 14c, 14d contains lubricating oil to reduce the noise and wear.

As described above, in the hinge device in accordance with the present invention, the insert home 7 is formed on the shaft 3 and the protrusion members 21, 23 formed on the through holes of the disc springs 17a, 17b, 17c, 17d and the guide washer 19 fit into the insert home 7, thus the movements of the disc springs 17a, 17b, 17c, 17d and the guide washer 19 are minimized enhancing the operation efficiency.

Moreover, the space washers 13a, 13b, 13c, 13d comprises the groove 15 formed on the circumferences of the hole members 14a, 14b, 14c, 14d in the rotational direction contains lubricating oil to reduce the noise and wear.

Although the invention has been shown and described with respect to detailed embodiments thereof, it should be understood by those skilled in the art that various changes and omissions in form and detail may be made therein without departing from the spirit and the scope of the invention.

What is claimed is:

1. A hinge device comprising:

a bracket having a shaft hole;

a shaft inserted through the shaft hole, the shaft having a first end and a second end with threads extending inward from the second end;

a longitudinal insert home extending along the shaft proximate the second end;

first and second shoulder members located between the first and second ends of the shaft at a fixed distance from one another, the first shoulder member being larger than the second shoulder member;

a torsion spring coupled between the bracket and the first shoulder member of the shaft to apply torque to the shaft as the shaft is rotated relative to the bracket;

a plurality of space washers located on the shaft and placed on at least one side of the bracket;

a plurality of disc springs having respective through holes each having a first protrusion member located in the insert home of the shaft, the disc springs being located between the second end of the shaft and the bracket;

a guide washer having a through hole which has a second protrusion member located in the insert home of the shaft, the guide washer located between the disc springs and the second end of the shaft; and a nut screwed onto the threads of the shaft to stabilize the torsion spring, space washers, disc springs and guide washer on the shaft.

2. The hinge device as claimed claim 1, wherein the space washers each include a hole receiving the shaft, at least some of the holes of the space washers including a groove containing lubricating oil which is evenly distributed to reduce the noise and wear.

* * * * *